US009727305B2

(12) United States Patent
Jia et al.

(10) Patent No.: US 9,727,305 B2
(45) Date of Patent: Aug. 8, 2017

(54) METHOD AND ELECTRONIC DEVICE FOR INFORMATION PROCESSING (71) Applicants: BEIJING LENOVO SOFTWARE LTD., Beijing (CN); LENOVO (BEIJING) LIMITED, Beijing (CN)

(72) Inventors: Xu Jia, Beijing (CN); Xinru Hou, Beijing (CN); Qianying Wang, Beijing (CN); Gaoge Wang, Beijing (CN); Shifeng Peng, Beijing (CN); Yuanyi Zhang, Beijing (CN); Jun Chen, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 259 days.

(21) Appl. No.: 14/220,592

(22) Filed: Mar. 20, 2014

(65) Prior Publication Data
US 2014/0289633 A1 Sep. 25, 2014

(30) Foreign Application Priority Data
Mar. 25, 2013 (CN) .......................... 2013 1 0096587

(51) Int. Cl.
*G06F 3/048* (2013.01)
*G06F 3/16* (2006.01)
(Continued)

(52) U.S. Cl.
CPC ............ *G06F 3/167* (2013.01); *G06F 3/0485* (2013.01); *G06F 3/04883* (2013.01); *G06F 2203/04806* (2013.01)

(58) Field of Classification Search
CPC ...... G06F 3/017; G06F 3/048–3/04886; G06F 17/27–17/30654; G10L 15/02–15/26; G10L 17/00–17/26
See application file for complete search history.

(56) References Cited

U.S. PATENT DOCUMENTS

2003/0128192 A1* 7/2003 van Os ................. G06F 3/0485
345/173
2009/0253463 A1* 10/2009 Shin .................. H04M 1/72583
455/563

FOREIGN PATENT DOCUMENTS

CN 102883041 A 1/2003
CN 1613049 A 5/2005
CN 102150087 A 10/2012

OTHER PUBLICATIONS

First Office Action issued by SIPO for Chinese patent application No. 201310096587.6, dated Oct. 8, 2016, p. 13.
(Continued)

*Primary Examiner* — Claudia Dragoescu (57) ABSTRACT

The present disclosure provides a method and an electronic device for information processing. The electronic device comprises a sensing unit and a display unit having a display area. The display unit displays a graphical interface. The display area displays a first part of the graphical interface. The method comprises: detecting a first operation by the sensing unit when the display unit displays the first part of the graphical interface; displaying the second part of the graphical interface on the display unit in response to the first operation; detecting a second operation; determining whether a preset condition is satisfied during the detecting of the second operation to obtain first decision information; and displaying a speech control on the display unit when the first decision information indicates that the preset condition is satisfied during the detecting of the second operation.

4 Claims, 5 Drawing Sheets (51) Int. Cl.
*G06F 3/0485* (2013.01)
*G06F 3/0488* (2013.01)

(56) References Cited

OTHER PUBLICATIONS

English abstract of CN 102883041A, dated Jan. 16, 2003, p. 1.
English abstract of CN 1613049A, dated May 4, 2005, p. 2.
English abstract of CN 102750087A, dated Oct. 24, 2012, p. 1.

\* cited by examiner

METHOD AND ELECTRONIC DEVICE FOR INFORMATION PROCESSING

TECHNICAL FIELD

The present disclosure relates to a computer technical field, and in particular, to a method and an electronic device for information processing.

BACKGROUND

With the rapid development of electronic devices, they are more and more widely applied in daily lives. An existing electronic device has increasingly rich functions such as smart phones, PDAs, etc, powerful processing capabilities, and anywhere network access, so that it becomes more and more popular. Meanwhile, storage space of the existing electronic device is also growing, which allows more data to be stored in the storage space, so that a higher demand for the electronic device's capability of fast search is proposed. Specifically, a user wishes to find desired data for the shortest time. Following such a demand, the existing electronic device may achieve a function of accurately searching data by installing a speech assistant and the like software. Taking a mobile phone as an example, it is possible to receive speech data through a Siri speech assistant and to accurately look for user desired data by using the speech data.

During implementations of technical solutions according to embodiments of the present disclosure, inventors of the present disclosure discovered at least the following technical problems in the prior art.

When searching a graphical interface for data in an existing electronic device, a technical problem is that if an operation on the graphical interface satisfies a predetermined condition, the existing electronic device does not automatically switch on a speech assistant, and the graphical interface and the speech assistant cannot be displayed in the same screen. This is because when it is required to search the graphical interface such as an address-book interface for a contact, if the speech assistant such as Siri is used to search for the contact, it is needed for the electronic device to automatically switch to Siri dedicated interface for receiving speech data. Thereby, it is neither possible to display the graphical interface and the speech assistant in the same screen, nor possible to switch on the speech assistant following an operation on the graphical interface. This leads to user inconvenience as well as poor user experience.

SUMMARY

Embodiments of the present disclosure provide a method and an electronic device for information processing, so as to address the following technical problems raising when searching a graphical interface for data in an existing electronic device: a speech assistant would not be switched on automatically and displaying in the same screen is not allowed, if an operation on the graphical interface satisfies a predetermined condition.

An embodiment of the present disclosure provides a method for information processing. The method is applied in an electronic device comprising a sensing unit and a display unit having a display area. The display unit displays a graphical interface. The display area displays a first part of the graphical interface. The method includes steps of:

detecting a first operation by the sensing unit when the display unit displays the first part of the graphical interface, the first operation being used to control a second part of the graphical interface to be displayed on the display unit;

displaying the second part of the graphical interface on the display unit in response to the first operation;

detecting a second operation, the first operation and the second operation being the same, or the first operation and the second operation being different parts of the same operation, and the second operation being used to control a third part of the graphical interface to be displayed on the display unit;

determining whether a preset condition is satisfied during the detecting of the second operation to obtain first decision information; and displaying a speech control on the display unit when the first decision information indicates that the preset condition is satisfied during the detecting of the second operation, the speech control being used to switch on a speech recognition engine.

Alternatively, the method further includes steps of, after determining whether the preset condition is satisfied during the detecting of the second operation to obtain the first decision information, when the first decision information indicates that the preset condition is not satisfied during the detecting of the second operation, displaying the third part of the graphical interface in the display area in response to the second operation.

Alternatively, determining whether the preset condition is satisfied during the detecting of the second operation to obtain the first decision information includes: detecting second parameter information corresponding to the second operation; and determining whether the second parameter information is the same as first parameter information corresponding to the first operation, to obtain the first decision information.

Alternatively, when the second operation is a sliding operation, determining whether the preset condition is satisfied during the detecting of the second operation to obtain the first decision information includes: detecting a number of slides corresponding to the second operation; and detecting whether the number of slides reaches a preset threshold to obtain the first decision information.

Alternatively, when the first operation and the second operation are the same, determining whether the preset condition is satisfied during the detecting of the second operation to obtain the first decision information includes: detecting a first starting point corresponding to the first operation; detecting a first ending point corresponding to the second operation; and detecting whether a first distance from the first starting point to the first ending point is larger than or equal to a preset distance, to obtain the first decision information.

Alternatively, after displaying the speech control on the display unit, the method further includes: detecting a speech manipulation operation for operating the speech control, and switching on the speech recognition engine; receiving speech data, recognizing the speech data by the speech recognition engine, and obtaining a control instruction for controlling the graphical interface and a controlled object, which are contained in the speech data; and displaying a part of the controlled object in the graphical interface displayed by the display unit, in response to the control instruction.

Another embodiment of the present disclosure further provides a method for information processing. The method is applied in an electronic device comprising a sensing unit and a display unit having a display area. The display unit displays a graphical interface. The method includes: displaying a speech control on the display unit when the display unit displays a first part of the graphical interface, the speech being used to switch on a speech recognition engine.

Alternatively, displaying the speech control on the display unit when the display unit displays the first part of the graphical interface includes steps of: detecting a second part of the graphical interface other than the first part when the display unit displays the first part of the graphical interface; detecting whether third parameter information on the second part of the graphical interface satisfies a preset rule; and displaying a speech control on the display unit when the third parameter information satisfies the preset rule.

Alternatively, detecting whether the third parameter information on the second part of the graphical interface satisfies a preset rule includes: detecting a first length of the second part of the graphical interface displayed in the display area, as the third parameter information; and detecting whether the first length reaches a preset length or not.

Alternatively, displaying the speech control on the display unit when the third parameter information satisfies the preset rule includes: displaying the speech control on the display unit when the first length reaches the preset length.

Alternatively, after displaying the speech control on the display unit, the method further includes: detecting a speech manipulation operation for operating the speech control, and switching on the speech recognition engine; receiving speech data, recognizing the speech data by the speech recognition engine, and obtaining a control instruction for controlling the graphical interface and a controlled object, which are contained in the speech data; and displaying a part of the controlled object in the graphical interface displayed by the display unit, in response to the control instruction.

An embodiment of the present disclosure provides an electronic device. The electronic device includes a sensing unit and a display unit having a display area. The display unit displays a graphical interface. The display area displays a first part of the graphical interface. The electronic device includes: a circuit board; and a processor arranged on the circuit board and configured to: detect a first operation by the sensing unit when the display unit displays the first part of the graphical interface, the first operation being used to control a second part of the graphical interface to be displayed on the display unit; display the second part of the graphical interface on the display unit in response to the first operation; detect a second operation, the first operation and the second operation being the same or the first operation and the second operation being different parts of the same operation, and the second operation being used to control a third part of the graphical interface to be displayed on the display unit; determine whether a preset condition is satisfied during the detecting of the second operation to obtain first decision information; and display a speech control on the display unit when the first decision information indicates that the preset condition is satisfied during the detecting of the second operation, the speech control being used to switch on a speech recognition engine.

Another embodiment of the present disclosure further provides an electronic device. The electronic device includes a sensing unit and a display unit having a display area. The display unit displays a graphical interface. The electronic device includes: a circuit board; a processor arranged on the circuit board and configured to display a speech control on the display unit when the display unit displays a first part of the graphical interface, the speech being used to switch on a speech recognition engine.

One or more technical solutions according to the embodiments of the present disclosure have at least technical effects or advantages as follows.

Firstly, according to the embodiments of the present disclosure, after receiving the first operation and the second operation, when it is detected that the preset condition is satisfied during the process of detecting the second operation, the speech control is displayed on the display unit. Since the first operation and the second operation are both used to control different parts of the graphical interface to be displayed on the display unit, it may be roughly determined that it is needed to search the graphical interface for the data. Furthermore, use of the preset condition allows to determining whether to search the graphical interface for the data more accurately. To this end, displaying the speech control on the display unit allows the graphical interface and the speech control to be displayed on the same screen, thereby solving the following technical problems occurring when searching an graphical interface of an existing electronic device for the data: a speech assistant would not be switched on automatically and displaying in the same screen is not allowed, if an operation on the graphical interface satisfies a predetermined condition. Then, this may achieve technical effects for the existing electronic device as follows: when it is detected that an operation on the graphical interface satisfies a preset condition, the speech assistant can be switched on automatically and the graphical interface and the speech control can be displayed on the same screen, thereby facilitating users while leading to better user experience.

Secondly, according to the embodiments of the present disclosure, upon the second parameter information of the second operation is the same as the first parameter of the first operation, or the number of slides corresponding to the second operation satisfies the preset threshold, or the first distance from the first starting point corresponding to the first operation to the first ending point corresponding to the second operation is not smaller than the preset distance, the speech assistant is automatically switched on, so that it is allowed to more accurately determine whether it is needed to search for data, and the speech control may be switched on and displayed in the same screen when it is determined it is needed to search for data, thereby facilitating users while leading to a better user experience.

Thirdly, according to the embodiments of the present disclosure, after displaying the speech control on the display unit, a speech recognition engine is switched on by the speech manipulation operation. The speech recognition engine is used to recognize received speech data. Then, a control instruction for controlling the graphical interface, which is contained in the speech data, is used to control a part of a controlled object to be displayed in the graphical interface displayed on the display unit, so that the speech control may only search the graphical interface for the controlled object. This may reduce time for searching and improve efficiency of searching, thereby facilitating users while leading to a better user experience.

DETAILED DESCRIPTION OF THE EMBODIMENTS

Embodiments of the present disclosure provide a method and an electronic device for information processing, so as to address the following technical problems occurring when searching data on a graphical interface for an existing electronic device: a speech assistant would not be switched on automatically and the displaying in the same screen is not allowed, if an operation on the graphical interface satisfies a predetermined condition.

Technical solutions according to the embodiments of the present disclosure are intended to solve the above technical problems. A general idea is described as follows.

According to the embodiments of the present disclosure, after receiving the first operation and the second operation, when it is detected that the preset condition is satisfied during the process of detecting the second operation, the speech control is displayed on the display unit. Since the first operation and the second operation are both used to control different parts of the graphical interface to be displayed on the display unit, it may be roughly determined whether to search the graphical interface for data. Furthermore, use of the preset condition allows to determining more accurately that it is needed to search data on the graphical interface. To this end, displaying the speech control on the display unit allows the graphical interface and the speech control to be displayed on the same screen, thereby solving the following technical problems occurring when searching data on an graphical interface of an existing electronic device: a speech assistant would not be switched on automatically and the displaying in the same screen is not allowed, if an operation on the graphical interface satisfies a predetermined condition. Then, this may achieve technical effects for the existing electronic device as follows: when it is detected that an operation on the graphical interface satisfies a preset condition, the speech assistant can be switched on automatically, and the graphical interface and the speech control can be displayed on the same screen, thereby facilitating users while leading to better user experience.

In order to better understand the above technical solutions, detailed descriptions on the above technical solutions will be made in combination with drawings and specific implementations.

One embodiment of the present disclosure provides a method for information processing. The method is applied in an electronic device comprising a sensing unit and a display unit having a display area. The display unit displays a graphical interface. The display area displays a first part of the graphical interface.

For example, the electronic device may be a tablet computer, a smart phone, a laptop computer, and the like electronic device. The display unit may be an electronic device such as a Liquid Crystal Display, a LED display screen, a LCD display screen, etc.

The sensing unit may be, e.g., a capacitive sensor, a resistive sensor, a pressure sensor and the like electronic device.

Figure 1:
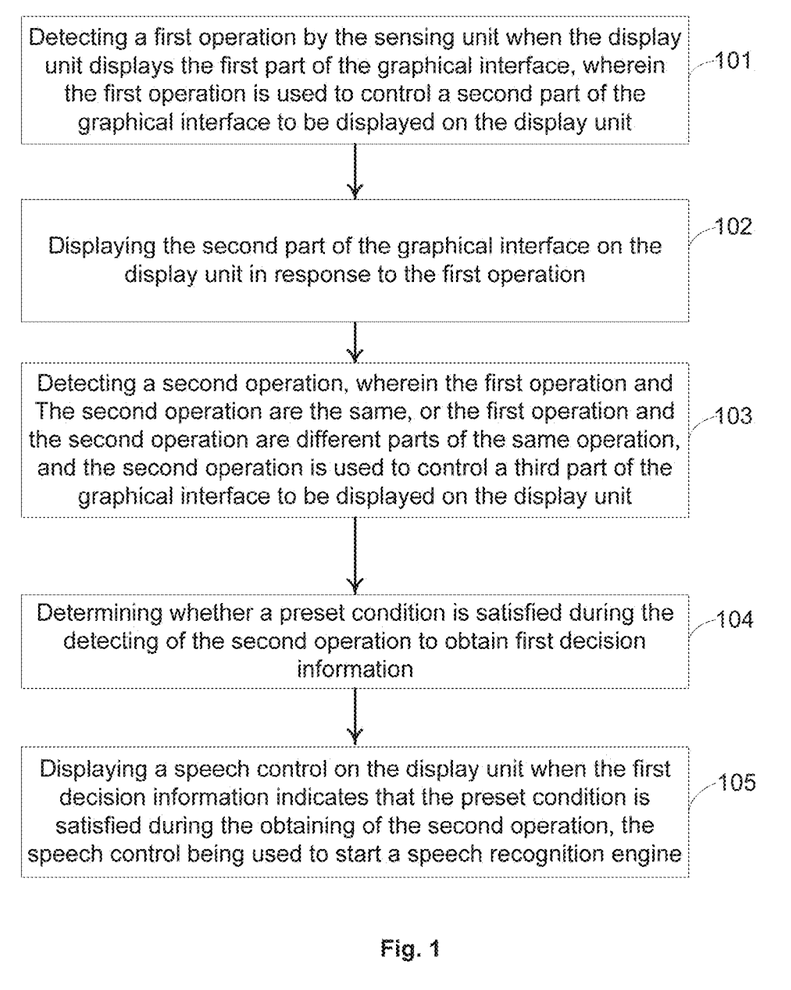
FIG. 1 is a flowchart illustrating a method for information processing according to a first embodiment of the present disclosure.

Referring to FIG. 1, the method includes:

step 101: detecting a first operation by the sensing unit when the display unit displays the first part of the graphical interface, wherein the first operation is used to control a second part of the graphical interface to be displayed on the display unit;

step 102: displaying the second part of the graphical interface on the display unit in response to the first operation;

step 103: detecting a second operation, wherein the first operation and the second operation are the same or the first operation and the second operation are different parts of the same operation, and the second operation is used to control a third part of the graphical interface to be displayed on the display unit;

step 104: determining whether a preset condition is satisfied during the detecting of the second operation, to obtain first decision information; and step 105: displaying a speech control on the display unit when the first decision information indicates that the preset condition is satisfied during the detecting of the second operation, wherein the speech control is used to switch on a speech recognition engine.

At step 101, the first operation is obtained by the sensing unit when the display unit displays the first part of the graphical interface. The first operation is used to control the second part of the graphical interface to be displayed on the display unit.

In a specific implementation, after the display unit is switched on, when it is detected that the first part of the graphical interface is displayed on the display unit, i.e., a first display size representing the display area of the display unit is smaller than a second display size representing a whole part of the graphical interface (so that the whole part of the graphical interface cannot be displayed in the display area), the first operation for controlling the second part of the graphical interface to be displayed on the display unit is detected by the sensing unit. For example, the first operation may be a sliding operation, a dragging operation, a scrolling operation of mouse wheel, etc.

Detailed explanations will be made in case that the display unit is a capacitive screen and the sensor is a capacitive sensor. After the display unit is switched on, it is detected whether the first part of the graphical interface is displayed on the display unit. The graphical interface may be an interface such as an address-book interface, a call-logs interface, a short-message-list interface, a mail-list interface, a program-list interface, etc. The graphical interface contains too much information, thus the display unit can only display the first part of the graphical interface. When the capacitive sensor detects a sliding operation or a scrolling operation of mouse wheel on the capacitive screen, the sliding operation or the scrolling operation of mouse wheel is used as the first operation.

During the practical applications, taking a smart phone having a capacitive touch screen as its display screen, as an example, a first part of an address-book interface is displayed in the capacitive touch screen due to large amount of address-book information stored in the smart phone. For example, the capacitive touch screen can display only 8 items of address-book information at a time. When the address-book interface contains 50 items of address-book information, 8 items of address-book information displayed on the capacitive touch screen are considered as a first part of the address-book interface. When a second part of the address-book interface is displayed by a sliding operation of the user, the sliding operation may be obtained by the capacitive sensor.

Next, the method proceeds to step 102, where the second part of the graphical interface is displayed on the display unit in response to the first operation. In a specific implementation, upon detecting the first operation at step 102, a response is made immediately to the first operation. The second part of the graphical interface corresponding to the first operation is obtained based on a movement distance and/or a movement speed of the first operation, and then displayed on the display unit.

Specifically, when the first operation is a sliding operation, the second part of the graphical interface is determined based on a movement distance and a movement speed of the sliding operation. When the movement speed of the sliding operation exceeds a threshold, such as 10 cm/sec, 8 cm/sec, etc, the second part of the graphical interface is determined based on corresponding algorithms in the electronic device. The larger the movement speed is, the more the second part of the graphical interface is away from the first part. When the movement speed of the sliding operation is lower than the threshold, the second part of the graphical interface may be determined based on the movement distance of the sliding operation. For example, when 8 items of address-book information of the address-book interface are displayed on the capacitive touch screen, and it is detected that the sliding operation slides 4.5 cm down, address-book information within 4.5 cm below the 8 items of contacts information in the address-book interface are displayed on the capacitive touch screen.

Figure 2:
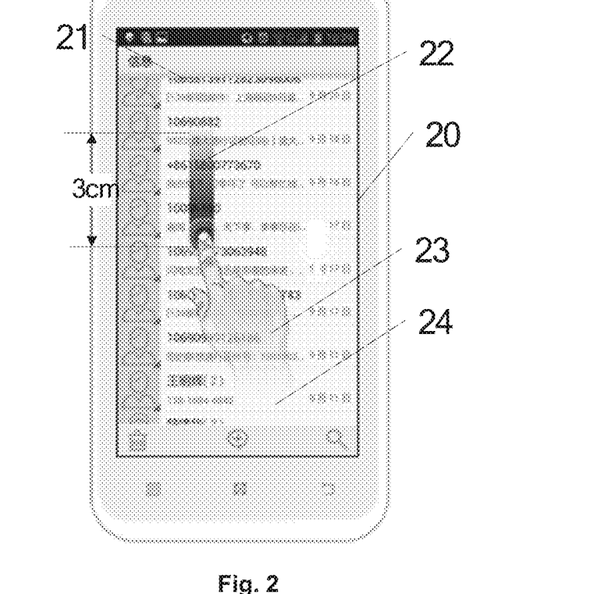
FIG. 2 is a structure diagram when performing a first operation on a display unit according to the first embodiment of the present disclosure.

During the practical applications, taking a smart phone A as an example, referring to FIG. 2, when a first part 24 of a call-logs interface is displayed on a display area 21 of a touch screen 20 of the smart phone A, and a finger 23 of a first user performs a sliding operation 22 in a display area 21, the sliding operation 22 is obtained by a sensing unit arranged on the touch screen 20. When it is detected that the sliding operation 22 slides 3 cm down, and a sliding speed of the sliding operation 22 does not exceed a threshold of 8 cm/sec, first display information within 3 cm from the top of the first part 24 is moved out from the top of the display area 21 and second display information within 3 cm below the first part 24 in the call-logs interface is moved in from the bottom of the display area 21. In this way, display information in the bottom of the first part 24 and the second display information are displayed on the display area 21 as the second part of the graphical interface.

Next, the method proceeds to step 103, where a second operation is detected. The first operation and the second operation are the same, or the first operation and the second operation are different parts of the same operation. The second operation is used to control a third part of the graphical interface to be displayed on the display unit.

In a specific implementation, the second part of the graphical interface is displayed on the display unit. The second operation is detected by the sensing unit. The second operation may be an operation such as a sliding operation, a dragging operation, a scrolling operation of mouse wheel, etc. When the first operation is a sliding operation, the second operation is also a sliding operation. When the first operation is a dragging operation, the second operation is also a dragging operation. When the first operation is a scrolling operation of mouse wheel, the second operation is also a scrolling operation of mouse wheel.

Take a tablet computer as an example for describing a case, where the first operation and the second operation are the same. When there is address-book information displayed on a touch screen of a tablet computer B, a first sliding operation is detected by a sensing unit on the touch screen. Within a time period such as 10 seconds, 5 seconds, 3 seconds, etc. after detecting the first sliding operation, the sensing unit does not detect any operation body touching the touch screen. After such a time period, a second sliding operation is detected. The second sliding operation is used to control a third part of the address-book information to be displayed on the touch screen. Then, it may be determined that the first operation and the second operation are the same. When the first operation and the second operation are the same operation, refer to FIGS. 2 and 3 for detailed explanations. When the sensing unit on the touch screen 20 detects the sliding operation 22, the finger 23 of the first user stays at the bottom of the sliding operation 22 for 1 second, 2 seconds, etc. and then proceeds to slide down, so that the sensing unit can detect the second sliding operation 25. An ending position, at which the sensing unit can detect the sliding operation 22, is the same as a starting position of the second sliding operation 25. Moreover, it may be detected that within a time period from a time after starting the sliding operation 22 to a time before starting the second sliding operation 25, the finger 23 always clicks on the ending position. Thereby, it may be determined that the sliding operation 22 and the second sliding operation 25 are the same operation.

Next, the method proceeds to step 104 of determining whether a preset condition is satisfied during the process of detecting the second operation, to obtain first decision information. In a specific implementation, second parameter information corresponding to the second operation is obtained, and then it is determined whether the second parameter information is the same as the first parameter information corresponding to the first operation, so as to obtain the first decision information.

To be specific, a movement direction of the second operation may be used as the second parameter information. When the second parameter information indicates moving down, if the first parameter information also indicates moving down, it may be determined that the second parameter information is the same as the first parameter information, so that the first decision information indicates that the preset condition is satisfied during the process of detecting the second operation. If the first parameter information indicates moving to left, moving to right or moving up, it may be determined that the second parameter information is different from the first parameter information, so that the first decision information indicates that the preset condition is not satisfied during the process of detecting the second operation. Also, a movement direction and a movement speed of the second operation may be used as the second parameter information. When the first operation has a movement direction the same as that of the second operation, it is still needed to detect whether a second movement speed of the second operation is not smaller than a first movement speed of the first operation. If the both directions are the same and the second movement speed is not smaller than the first movement speed, the first decision information indicates that the preset condition is satisfied during the process of detecting the second operation. Otherwise, the first decision information indicates that the preset condition is not satisfied. The both directions being the same may refer to whole movement directions of the both operations are the same. For example, if the first operation moves down vertically while the second operation moves down obliquely, this means that the first operation has a different direction from that of the second operation.

During the practical applications, referring to FIG. 2, after the sensing unit on the touch screen 20 detects the sliding operation 22, the second operation is detected by the sensing unit. A sliding direction of the second sliding operation is from bottom to top while a sliding direction of the sliding operation 22 is from top to bottom, so that the sliding direction of the second sliding operation is different from that of the sliding operation 22. Thereby, it may be determined that the first decision information indicates that the preset condition is not satisfied during the process of detecting the second operation. When the sliding direction of the second sliding operation is also from top to bottom, it may be determined that the first decision information indicates that the preset condition is satisfied during the process of detecting the second operation.

In a specific implementation, when the second operation is a sliding operation, determining whether the preset condition is satisfied during the detecting of the second operation to obtain the first decision information may be implemented by: detecting the number of slides corresponding to the second operation; and detecting whether the number of slides reaches a preset threshold, to obtain the first decision information.

Specifically, when the second operation is a sliding operation, the number of slides of the second operation is obtained and it is detected whether the number of slides reaches the preset threshold, so as to obtain the first decision information. When it is detected that the number of slides reaches the preset threshold, the first decision information indicates that the preset condition is satisfied during the process of detecting the second operation. If it is detected that the number of slides does not reach the preset threshold, the first decision information indicates that the preset condition is not satisfied during the process of detecting the second operation. The preset threshold may be a value such as 2, 3, 5, etc.

Figure 4:
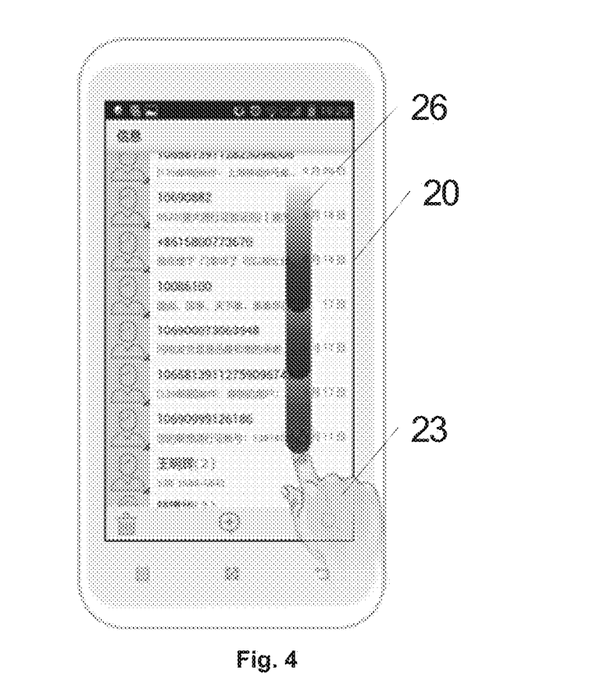
FIG. 4 is a structure diagram of performing a second kind of a second operation on a display unit in FIG. 2.

During the practical applications, taking a smart phone A as an example and referring to FIGS. 2 and 4, after detecting the sliding operation 22 by the sensing unit on the touch screen 20, the sensing unit obtains a third sliding operation 26 as the second operation and detects that the number of slides corresponding to the third sliding operation 26 is 3. When the preset threshold is 3, the number of slides is equal to the preset threshold, that is, the number of slides reaches the preset threshold. Then, it may be determined that the first decision information indicates that the preset condition is satisfied during the process of detecting the third sliding operation 26. When the preset threshold is 5, as 3<5, the number of slides does not reach the preset threshold. Therefore, it may be determined that the first decision information indicates that the preset condition is not satisfied during the process of detecting the third sliding operation 26.

In a specific implementation, when the first operation and the second operation are the same, determining whether the preset condition is satisfied during the detecting of the second operation to obtain the first decision information may be implemented by: obtaining a first starting point corresponding to the first operation; obtaining a first ending point corresponding to the second operation; and detecting whether a first distance from the first staring point to the first ending point is larger than or equal to a preset distance, to obtain the first decision information.

Specifically, the first distance from the first starting point to the first ending point may be obtained. Then, it is detected whether the first distance is not smaller than the preset distance. When it is detected that the first distance is not smaller than the preset distance, the first decision information indicates that the preset condition is satisfied during the process of detecting the second operation. If it is detected that the first distance is smaller than the preset distance, the first decision information indicates that the preset condition is not satisfied during the process of detecting the second operation. The preset distance may be determined based on a display length of the display area. When a display length of the display area is 8 cm, the present distance may be a length such as 5 cm, 4 cm, 6 cm, etc. A length of the preset distance is not larger than the display length.

Figure 3:
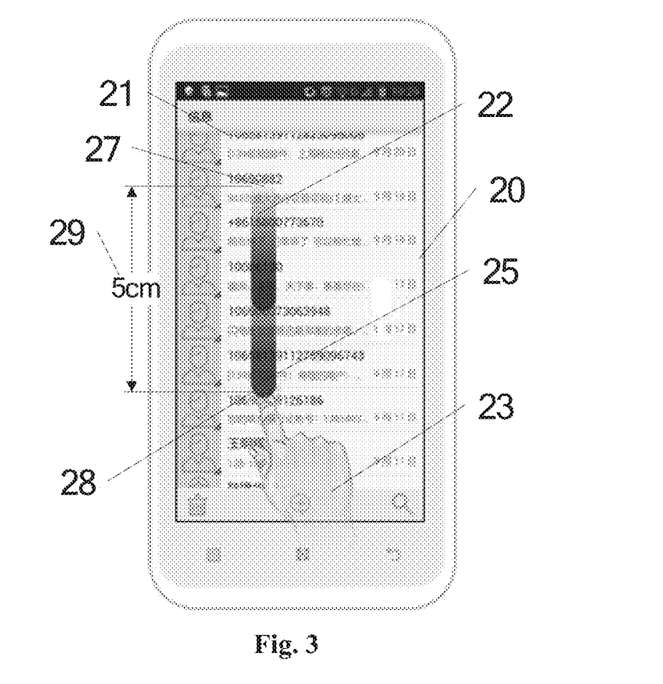
FIG. 3 is a structure diagram of performing a first kind of a second operation on a display unit in FIG. 2.

During the practical applications, taking the smart phone A as an example And referring to FIG. 3, a first coordinate parameter of a first starting point 27 at where the finger 23 of the user is performing the sliding operation 22 is obtained firstly. Then a second coordinate parameter of a first ending point 28 for the second sliding operation 25 is obtained. Based on the first coordinate parameter and the second coordinate parameter, it is detected that a first distance 29 from the first starting point 27 to the first ending point 28 is 5 cm. When the preset distance is 5 cm, a value of the first distance 29 is equal to the preset distance. Thus, it may be determined that the first decision information indicates that the preset condition is satisfied during the process of detecting the second sliding operation 25. When the preset distance is 6 cm, as 5<6, the first distance 29 is smaller than the preset distance. Hence, it may be determined that the first decision information indicates that the preset condition is not satisfied during the process of detecting the second sliding operation 25.

When the first decision information indicates that the preset condition is satisfied during the process of detecting the second operation, the method proceeds to step 105 of displaying a speech control on the display unit. The speech control is used to switch on a speech recognition engine.

In a specific implementation, when it is detected at step 104 that the first decision information indicates that the preset condition is satisfied during the process of detecting the second operation, a speech control for switching on a speech recognition engine is displayed on the display unit, so as to facilitate the user to switch on the speech control for information query.

Figure 5:
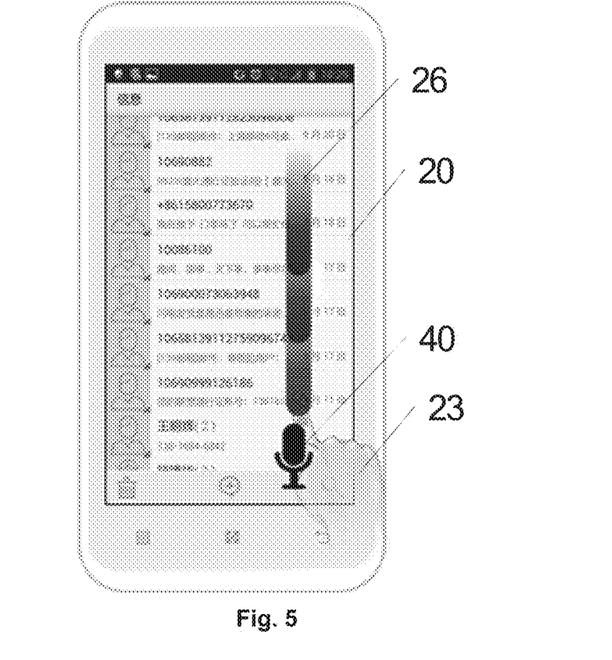
FIG. 5 is a structure diagram of displaying a speech control in FIG. 4.

Take the smart phone A as an example. Referring to FIG. 5, when the preset threshold is 3, it is detected that the number of slides corresponding to the third sliding operation 26 is 3. The number of slides is equal to the preset threshold, so that the number of slides reaches the preset threshold. Hence, it may be determined that the first decision information indicates that the preset condition is satisfied during the process of detecting the third sliding operation 26. In this way, the speech control 40 is displayed at a position of the ending point of the third sliding operation 26. Of course, the speech control 40 may be arranged at any position on the display area 21.

In another embodiment, after determining whether the preset condition is satisfied during the detecting of the second operation to obtain the first decision information, the method includes: when the first decision information indicates that the preset condition is not satisfied during the detecting of the second operation, displaying the third part of the graphical interface in the display area in response to the second operation.

Specifically, when the second parameter information is different from the first parameter information, or the number of slides does not reach the preset threshold, or the first distance is smaller than the preset distance, that is, in the case the first decision information indicates that the preset condition is not satisfied during the process of detecting the second operation, a response is immediately made to the second operation, and the third part of the graphical interface corresponding to the second operation is obtained based on a movement distance and/or a movement speed of the second operation and then displayed on the display unit.

To be specific, when the second operation is a sliding operation, the third part of the graphical interface is determined based on a movement distance and a movement speed of the sliding operation. When the movement speed of the sliding operation exceeds a threshold, such as 10 cm/sec, 8 cm/sec, etc, the third part of the graphical interface is determined based on corresponding algorithms in the electronic device. The larger the movement speed is, the more the third part of the graphical interface is away from the second part. When the movement speed of the sliding operation falls below the threshold, the third part of the graphical interface may be determined based on the movement distance of the sliding operation. For example, when 8 items of address-book information of the address-book interface are displayed on the capacitive touch screen, and it is detected that the sliding operation slides 4.5 cm down, address-book information within 4.5 cm below the 8 items of address-book information in the address-book interface are displayed on the capacitive touch screen.

In another embodiment, after displaying the speech control on the display unit, the method further includes: detecting a speech manipulation operation for operating the speech control, and switching on the speech recognition engine; receiving speech data, recognizing the speech data by using the speech recognition engine, and detecting a control instruction for controlling the graphical interface and a controlled object, which are contained in the speech data; and displaying a part of the controlled object in the graphical interface displayed by the display unit, in response to the control instruction.

In a specific implementation, first of all, it is detected whether the speech control has been clicked or not. When it is detected that the speech control has been clicked, an operation of clicking the speech control is obtained as the speech manipulation operation. A first application corresponding to the speech control is executed to switch on the speech recognition engine. Speech data is received by a speech reception unit (microphone) included in or connected to the electronic device. The speech data is recognized by the speech recognition engine to obtain a control instruction for controlling the graphical interface and a controlled object, which are contained in the speech data. In response to the control instruction, the controlled object is searched from information in the graphical interface, and a part of the controlled objects is displayed in the graphical interface displayed by the display unit.

Specifically, after an existing speech assistant such as Siri is switched on, when receiving speech data and performing content query, it is general to search content related to the speech data from all data stored in the electronic device. Taking an address book as an example, when it is required to search a contact, the Siri speech assistant may not only search in APPs of the contact, but also search in call logs, short messages and mail data. This may lead to increased capacity of a database corresponding to the speech data, longer time for searching, and low efficiency of searching. The speech control in the present disclosure searches the content related to the speech data only in a database corresponding to the graphical interface, thereby reducing the capacity of the database corresponding to the speech data while making searching more targeted. Furthermore, the capacity of the database may be reduced without changing a speed for searching, thereby reducing time for searching and improving searching effects.

During the practical applications, taking a smart phone as an example, when an address-book interface is displayed on a touch screen of the smart phone and the second operation satisfies the preset condition, the speech control may be displayed on the touch screen. When the sensing unit arranged on the touch screen detects that the speech control has been clicked, a first application corresponding to the speech control is executed. When receiving speech data from the user, i.e., "please search Mr. Wang's telephone number," by a microphone arranged in the smart phone, it may be determined that a control instruction is "search Mr. Wang's telephone number," and a controlled object is "Mr. Wang's telephone number." In response to the control instruction, Mr. Wang's telephone number, 136xxxxxxxx, is found in address-book information, and then displayed on the address-book interface.

Figure 6:
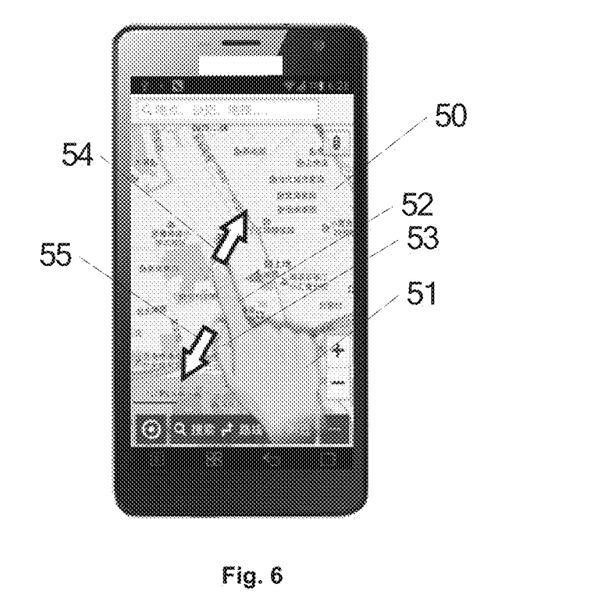
FIG. 6 is a structure schematic diagram of an electronic device according to the first embodiment of the present disclosure.
Figure 7:
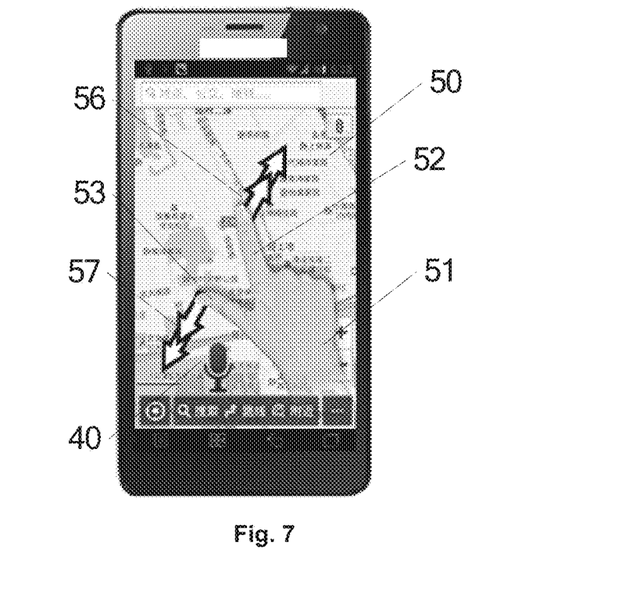
FIG. 7 is a structure schematic diagram of an electronic device according to a second embodiment of the present disclosure.

In the following, the technical solutions of the present disclosure will be explained by using one embodiment and referring to FIGS. 6 and 7. Take the smart phone B as an example. A map is displayed on a touch screen 50 of the smart phone B. A first finger 53 and a second finger 52 of a first user 51 contact with the touch screen 50, respectively. The first operation is an operation, where the first finger 53 moves along a first direction 55 and the second finger 52 moves along a second direction 54 so as to enlarge the map. The smart phone B obtains the second operation in response to the first operation. The second operation is an operation, where the first finger 53 moves along a third direction 57 and the second finger 52 moves along a fourth direction 56, so that the second operation is also an operation for enlarging the map. When the preset condition is that the first operation and the second operation perform the same function, it may be determined that the preset condition is satisfied during the process of detecting the second operation. Then the speech control 40 is displayed on the touch screen 50, After displaying the speech control 40 on the touch screen 50, when the sensing unit arranged on the touch screen detects that the speech control has been clicked, a first application corresponding to the speech control is executed. When receiving speech data from the user, i.e., "please search Jinli's location," by a microphone arranged in the smart phone, it may be determined that a control instruction is "search Jinli's location," and a controlled object is "Jinli's location." In response to the control instruction, Jinli's location, No. XX, XX Road, XX Street, is found and displayed in the map. Thus, it is possible to rapidly find an exact location of Jinli by the speech control 40, thereby facilitating users while providing better user experience.

One or more technical solutions according to the embodiments of the present disclosure may provide at least the following technical effects or advantages.

Firstly, according to the embodiments of the present disclosure, after receiving the first operation and the second operation, when it is detected that the preset condition is satisfied during the process of detecting the second operation, the speech control is displayed on the display unit.

Since the first operation and the second operation are both used to control different parts of the graphical interface to be displayed on the display unit, it may be roughly determined that it is needed to search data on the graphical interface. Furthermore, using the preset condition allows to more accurately determine that it is needed to search data on the graphical interface. To this end, displaying the speech control on the display unit allows the graphical interface and the speech control to be displayed on the same screen, thereby solving the following technical problems occurring when searching data on an graphical interface of an existing electronic device: a speech assistant would not be switched on automatically and displaying in the same screen is not allowed, if an operation on the graphical interface satisfies a predetermined condition. Then, this may achieve technical effects for the existing electronic device as follows: when it is detected that an operation on the graphical interface satisfies a preset condition, the speech assistant can be switched on automatically and the graphical interface and the speech control can be displayed on the same screen, thereby facilitating users while leading to better user experience.

Secondly, according to the embodiments of the present disclosure, upon the second parameter information of the second operation is the same as the first parameter of the first operation, or the number of slides corresponding to the second operation satisfies the preset threshold, or the first distance from the first starting point corresponding to the first operation to the first ending point corresponding to the second operation is not smaller than the preset distance, the speech assistant is automatically switched on, so that it is allowed to more accurately determine whether it is needed to search data, and the speech control may be switched on and displayed in the same screen when it is determined it is needed to search data, thereby facilitating users while leading to a better user experience.

Thirdly, according to the embodiments of the present disclosure, after displaying the speech control on the display unit, a speech recognition engine is switched on by the speech manipulation operation. The speech recognition engine is used to recognize received speech data. Then, a control instruction for controlling the graphical interface, which is contained in the speech data, is used to control a part of a controlled object to be displayed in the graphical interface displayed on the display unit, so that the speech control may search the controlled object only in data on the graphical interface. This may reduce time for searching and improve efficiency of searching, thereby facilitating users while leading to a better user experience.

Another embodiment of the present disclosure further provides a method for information processing. The method is applied in an electronic device including a sensing unit and a display unit having a display area. The display unit displays a graphical interface.

For example, the electronic device may be a tablet computer, a smart phone, a laptop computer, and the like electronic device. The display unit may be an electronic device such as a Liquid Crystal Display, a LED display screen, a LCD display screen, etc.

The sensing unit may be, e.g., a capacitive sensor, a resistive sensor, a pressure sensor and the like electronic device.

The method includes: displaying a speech control on the display unit when the display unit displays a first part of the graphical interface. The speech control is used to switch on a speech recognition engine.

In a specific implementation, after the display unit is switched on, when it is detected that a first display area size of the display area of the display unit is smaller than a second display size of a whole part of the graphical interface (so that the display unit is insufficient to display the whole part of the graphical interface, and only the first part of the graphical interface can be displayed on the display unit), a speech control is displayed on the display unit, so as to facilitate the user exactly searching information in the graphical interface.

Take the smart phone A as an example. Referring to FIG. 5, a call-logs interface is displayed in the display area 21 of the smart phone A. As a second display size of the call-logs interface is larger than a first display size of the display area 21, only a first part of call logs of the call-logs interface may be displayed in the display area 21. Then, the speech control 40 is displayed on the display area 21, so as to facilitate the user exactly searching call logs.

In another embodiment, displaying a speech control on the display unit when the display unit displays the first part of the graphical interface may specifically include: detecting a second part of the graphical interface other than the first part when the display unit displays the first part of the graphical interface; detecting whether third parameter information on the second part of the graphical interface satisfies a preset rule; and displaying the speech control on the display unit when the third parameter information satisfies the preset rule.

In a specific implementation, when the display unit displays the first part of the graphical interface, the second part of the graphical interface other than the first part is obtained. A first data account of the second part of the graphical interface is obtained as the third parameter information. It is determined whether the first data amount is not smaller than a second preset threshold, so as to determine whether the third parameter information satisfies the preset rule. When the first data amount is not smaller than the second preset threshold, it is determined that the third parameter information satisfies the preset rule and the speech control is displayed on the display unit. Otherwise, it is determined that the third parameter information does not satisfy the preset rule and the speech control is not displayed. The second preset threshold may be, e.g., such as 1000 characters, 20000 characters, 50000 characters, etc.

Take the smart phone A as an example. Referring to FIG. 2, the first part 24 of the call-logs interface is displayed on the display area 21 of the smart phone A, and the second part of the call-logs interface other than the first part is obtained. Assume that the first data amount of the second part of the call-logs interface is 50000 characters. When the second preset threshold is 20000 characters, as 50000>20000, it may be determined that the third parameter information satisfies the preset rule and the speech control 40 is displayed on the display area 21. When the second preset threshold is 60000 characters, as 50000<60000, it may be determined that the third parameter information does not satisfy the preset rule and the speech control 40 is not displayed on the display area 21. The second preset threshold may be set according to actual situations, so that the speech control is displayed only when there is large amount of information in the graphical interface. When there is small amount of information in the graphical interface, a speech of manually searching information may be higher than that of the speech control. Thus, in order to improve the user experience, the speech control is not displayed when there is small amount of information. The user may also display the speech control on the display unit using the above steps.

In a specific implementation, when detecting whether the third parameter information on the second part of the graphical interface satisfies the preset rule may be implemented by: detecting a first length of the second part of the graphical interface displayed in the display area as the third parameter information; and detecting whether the first length reaches a preset length.

Specifically, the first length of the second part of the graphical interface displayed in the display area is used as the third parameter information. It is determined whether the third parameter information satisfies the preset rule by detecting whether the first length reaches the preset length. When the first length reaches the preset length, it is determined that the third parameter information satisfies the preset rule and the speech control is displayed on the display unit. Otherwise, it is determined that the third parameter information does not satisfy the preset rule and the speech control is not displayed. The preset length may be, e.g., 20 cm, 30 cm, 10 cm, etc.

Take the smart phone A as an example. Referring to FIG. 2, the first part 24 of the call-logs interface 24 is displayed on the display area 21 of the smart phone A. The second part of the call-logs interface other than the first part 24 is obtained. The first length of the second part of the call-logs interface displayed in the display area 21 is 25 cm. When the preset length is 20 cm, as 25<20, it is determined that the third parameter information satisfies the preset rule. When the preset length is 30 cm, as 25<30, it is determined that the third parameter information does not satisfy the preset rule.

In a specific implementation, displaying the speech control on the display unit when the third parameter information satisfies the preset rule may specifically include: displaying the speech control on the display unit when the first length reaches the preset length.

Take the smart phone A as an example. Referring to FIG. 2, when the preset length is 20 cm, as 25>20, it is determined that the third parameter information satisfies the preset rule and the speech control 40 is displayed on the display area 21.

In another embodiment, after displaying the speech control on the display unit, the method further includes: detecting a speech manipulation operation for operating the speech control, and switching on the speech recognition engine; receiving speech data, recognizing the speech data by the speech recognition engine, and detecting a control instruction for controlling the graphical interface and a controlled object, which are contained in the speech data; and displaying a part of the controlled object in the graphical interface displayed by the display unit in response to the control instruction.

Specifically, first of all, it is detected whether the speech control has been clicked or not. When it is detected that the speech control has been clicked, an operation of clicking the speech control is obtained as the speech manipulation operation. A first application corresponding to the speech control is executed to switch on the speech recognition engine. Speech data is received by a speech reception unit (microphone) included in or connected to the electronic device. The speech data is recognized by the speech recognition engine to obtain a control instruction for controlling the graphical interface and a controlled object, which are contained in the speech data. In response to the control instruction, the controlled object is searched from information in the graphical interface, and a part of the controlled object is displayed in the graphical interface displayed by the display unit.

One or more technical solutions according to the embodiments of the present disclosure may provide at least the following technical effects or advantages.

Firstly, according to the embodiments of the present disclosure, after receiving the first operation and the second operation, when it is detected that the preset condition is satisfied during the process of detecting the second operation, the speech control is displayed on the display unit. Since the first operation and the second operation are both used to control different parts of the graphical interface to be displayed on the display unit, it may be roughly determined that it is needed to search data on the graphical interface. Furthermore, using the preset condition allows to more accurately determine that it is needed to search data on the graphical interface. To this end, displaying the speech control on the display unit allows the graphical interface and the speech control to be displayed on the same screen, thereby solving the following technical problems occurring when searching data on an graphical interface of an existing electronic device: a speech assistant would not be switched on automatically and displaying in the same screen is not allowed, if an operation on the graphical interface satisfies a predetermined condition. Then, this may achieve technical effects for the existing electronic device as follows: when it is detected that an operation on the graphical interface satisfies a preset condition, the speech assistant can be switched on automatically and the graphical interface and the speech control can be displayed on the same screen, thereby facilitating users while leading to better user experience.

Secondly, according to the embodiments of the present disclosure, after displaying the speech control on the display unit, a speech recognition engine is switched on by the speech manipulation operation. The speech recognition engine is used to recognize received speech data. Then, a control instruction for controlling the graphical interface, which is contained in the speech data, is used to control a part of a controlled object to be displayed in the graphical interface displayed on the display unit, so that the speech control may search the controlled object only in data on the graphical interface. This may reduce time for searching and improve efficiency of searching, thereby facilitating users while leading to a better user experience.

One embodiment of the present disclosure provides an electronic device, comprising a sensing unit and a display unit having a display area. The display unit displays a graphical interface. The display area displays a first part of the graphical interface.

For example, the electronic device may be a tablet computer, a smart phone, a laptop computer, and the like electronic device. The display unit may be an electronic device such as a Liquid Crystal Display, a LED display screen, a LCD display screen, etc.

The sensing unit may be, e.g., a capacitive sensor, a resistive sensor, a pressure sensor and the like electronic device.

Figure 8:
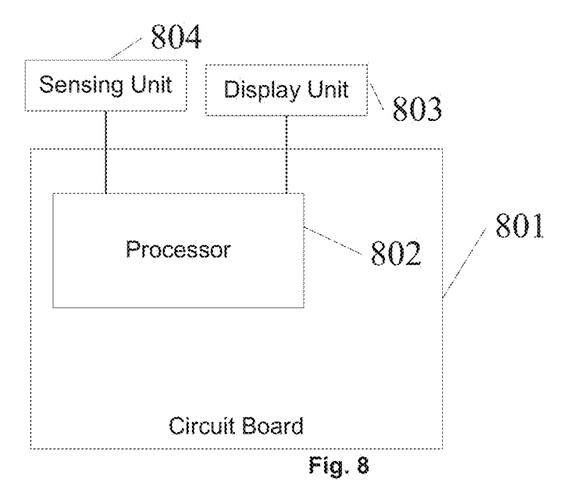
FIG. 8 is a block diagram of an electronic device according to an exemplary embodiment of the present disclosure.

Referring to FIG. 8, the electronic device includes a circuit board 801; and a processor 802 arranged on the circuit board 801. When the display unit 803 displays a first part of a graphical interface, the processor 802 obtains a first operation by a sensing unit 804. The first operation is used to control a second part of the graphical interface to be displayed on the display unit. The processor 802 displays the second part of the graphical interface on the display unit in response to the first operation. The processor 802 obtains a second operation. The first operation and the second operation are the same, or the first operation and the second operation are different parts of the same operation. The second operation is used to control a third part of the graphical interface to be displayed on the display unit. The processor 802 determines whether a preset condition is satisfied during the detecting of the second operation, to obtain first decision information. The processor 802 displays a speech control on the display unit 803 when the first decision information indicates that the preset condition is satisfied during the detecting of the second operation. The speech control is used to switch on a speech recognition engine.

The circuit board 801 may be a main board of the electronic device. Further, the processor 802 may be either a separate processor, or integrated in a processor.

Further, the processor 802 includes a first decision unit for detecting second parameter information corresponding to the second operation, and determining whether the second parameter information is the same as the first parameter information corresponding to the first operation, so as to obtain the first decision information.

Further, the processor 802 includes a second decision unit. When the second operation is a sliding operation, the second decision unit is used to obtain the number of slides corresponding to the second operation, and to detect whether the number of slides reaches a preset threshold, so as to obtain the first decision information.

Further, the processor 802 includes a third decision unit for, when the first operation and the second operation are the same operation, obtaining a first starting point corresponding to the first operation, obtaining a first ending point corresponding to the second operation, and detecting whether a first distance from the first starting point to the first ending point is not smaller than a preset distance to obtain the first decision information.

In another embodiment, the processor 802 further includes a first processing unit for, after a speech control is displayed on the display unit, detecting a speech manipulation operation for operating the speech control, and switching on the speech recognition engine; receiving speech data, recognizing the speech data by the speech recognition engine, and detecting a control instruction for controlling the graphical interface and a controlled object, which are contained in the speech data; and displaying a part of the controlled object in the graphical interface displayed by the display unit in response to the control instruction.

In yet another embodiment, the processor 802 includes a responding unit. After it is judged whether the preset condition is satisfied during the detecting of the second operation to obtain the first decision information, when the first decision information indicates that the preset condition is not satisfied during the detecting of the second operation, the responding unit is used to display the third part of the graphical interface in the display area in response to the second operation.

One or more technical solutions according to the embodiments of the present disclosure may provide at least the following technical effects or advantages:

Firstly, according to the embodiments of the present disclosure, after receiving the first operation and the second operation, when it is detected that the preset condition is satisfied during the process of detecting the second operation, the speech control is displayed on the display unit. Since the first operation and the second operation are both used to control different parts of the graphical interface to be displayed on the display unit, it may be roughly determined that it is needed to search for data on the graphical interface. Furthermore, using the preset condition allows to more accurately determine that it is needed to search for data on the graphical interface. To this end, displaying the speech control on the display unit allows the graphical interface and the speech control to be displayed on the same screen, thereby solving the following technical problems occurring when searching for data on an graphical interface of an existing electronic device: a speech assistant would not be switched on automatically and displaying in the same screen is not allowed, if an operation on the graphical interface satisfies a predetermined condition. Then, this may achieve technical effects for the existing electronic device as follows: when it is detected that an operation on the graphical interface satisfies a preset condition, the speech assistant can be switched on automatically and the graphical interface and the speech control can be displayed on the same screen, thereby facilitating users while leading to better user experience.

Secondly, according to the embodiments of the present disclosure, upon the second parameter information of the second operation is the same as the first parameter of the first operation, or the number of slides corresponding to the second operation satisfies the preset threshold, or the first distance from the first starting point corresponding to the first operation to the first ending point corresponding to the second operation is not smaller than the preset distance, the speech assistant is automatically switched on, so that it is allowed to more accurately determine whether it is needed to search for data, and the speech control may be switched on and displayed in the same screen when it is determined it is needed to search for data, thereby facilitating users while leading to a better user experience.

Thirdly, according to the embodiments of the present disclosure, after displaying the speech control on the display unit, a speech recognition engine is switched on by the speech manipulation operation. The speech recognition engine is used to recognize received speech data. Then, a control instruction for controlling the graphical interface, which is contained in the speech data, is used to control a part of a controlled object to be displayed in the graphical interface displayed on the display unit, so that the speech control may search for the controlled object only in data on the graphical interface. This may reduce time for searching and improve efficiency of searching, thereby facilitating users while leading to a better user experience.

Figure 9:
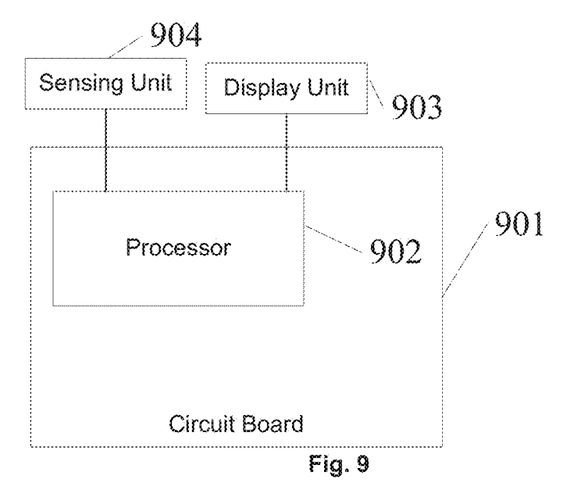
FIG. 9 is a block diagram of an electronic device according to an exemplary embodiment of the present disclosure.

Another embodiment of the present disclosure further provides an electronic device comprising a display unit 903 and a sensing unit 904. The display unit 903 has a display area. The display unit 903 displays a graphical interface. The display area displays a first part of the graphical interface.

For example, the electronic device may be a tablet computer, a smart phone, a laptop computer, and the like electronic device. The display unit may be an electronic device such as a Liquid Crystal Display, a LED display screen, a LCD display screen, etc.

The sensing unit may be, e.g., a capacitive sensor, a resistive sensor, a pressure sensor and the like electronic device.

Referring to FIG. 9, the electronic device includes a circuit board 901 and a processor 902 arranged on the circuit board 901. The processor 902 is configured to display a speech control on the display unit 903 when the display unit 903 displays a first part of the graphical interface. The speech is used to switch on a speech recognition engine.

The processor 902 includes a display control unit. When the display unit 903 displays the first part of the graphical interface, the display control unit is used to obtain a second part of the graphical interface other than the first part, to detect whether third parameter information on the second part of the graphical interface satisfies a preset rule, and to display the speech control on the display unit 903 when the third parameter information satisfies the preset rule.

Furthermore, the display control unit includes a first decision sub-unit for obtaining a first length of the second part of the graphical interface displayed in the display area as the third parameter information and detecting whether the first length reaches a preset length.

Furthermore, the display control unit includes a first display sub-unit for displaying a speech control on the display unit 903 when the first length reaches the preset length.

Furthermore, the processor 902 includes a second processing unit. After the speech control is displayed on the display unit, the second processing unit is used to obtain a speech manipulation operation for operating the speech control, and switch on the speech recognition engine; to receive speech data, recognize the speech data by the speech recognition engine, and obtain a control instruction for controlling the graphical interface and a controlled object, which are contained in the speech data; and to display a part of the controlled object in the graphical interface displayed by the display unit 903 in response to the control instruction.

Firstly, according to the embodiments of the present disclosure, after receiving the first operation and the second operation, when it is detected that the preset condition is satisfied during the process of detecting the second operation, the speech control is displayed on the display unit. Since the first operation and the second operation are both used to control different parts of the graphical interface to be displayed on the display unit, it may be roughly determined that it is needed to search for data on the graphical interface. Furthermore, using the preset condition allows to more accurately determine that it is needed to search for data on the graphical interface. To this end, displaying the speech control on the display unit allows the graphical interface and the speech control to be displayed on the same screen, thereby solving the following technical problems occurring when searching for data on an graphical interface of an existing electronic device: a speech assistant would not be switched on automatically and displaying in the same screen is not allowed, if an operation on the graphical interface satisfies a predetermined condition. Then, this may achieve technical effects for the existing electronic device as follows: when it is detected that an operation on the graphical interface satisfies a preset condition, the speech assistant can be switched on automatically and the graphical interface and the speech control can be displayed on the same screen, thereby facilitating users while leading to better user experience.

Secondly, according to the embodiments of the present disclosure, upon the second parameter information of the second operation is the same as the first parameter of the first operation, or the number of slides corresponding to the second operation satisfies the preset threshold, or the first distance from the first starting point corresponding to the first operation to the first ending point corresponding to the second operation is not smaller than the preset distance, the speech assistant is automatically switched on, so that it is allowed to more accurately determine whether it is needed to search for data, and the speech control may be switched on and displayed in the same screen when it is determined it is needed to search for data, thereby facilitating users while leading to a better user experience.

Thirdly, according to the embodiments of the present disclosure, after displaying the speech control on the display unit, a speech recognition engine is switched on by the speech manipulation operation. The speech recognition engine is used to recognize received speech data. Then, a control instruction for controlling the graphical interface, which is contained in the speech data, is used to control a part of a controlled object to be displayed in the graphical interface displayed on the display unit, so that the speech control may search the controlled object only in data on the graphical interface. This may reduce time for searching and improve efficiency of searching, thereby facilitating users while leading to a better user experience.

Although preferred embodiments of the present disclosure have been described, those skilled in the art may make additional changes and modifications on these embodiments upon learning about basic inventive concepts. Thus, the appended claims are intended to be construed as encompassing the preferred embodiments and all changes and modifications falling within the scope of the present disclosure.

It should be understood by those skilled in the art that various modifications and variants can be made to the present disclosure without departing from the spirit and scope of the present disclosure. If these modifications and variants to the present disclosure fall within the scope of the claims and equivalents thereof, the present disclosure is also intended to encompass these modifications and variants.

What is claimed is:

1. A method for information processing in an electronic device comprising a sensing unit and a display unit having a display area, the display unit displaying a graphical interface, the display area displaying a first part of the graphical interface, the method comprising:
    detecting a first operation by the sensing unit when the display unit displays the first part of the graphical interface, the first operation being used to control a second part of the graphical interface to be displayed on the display unit;
    displaying the second part of the graphical interface on the display unit in response to the first operation;
    detecting a second operation, the first operation and the second operation being the same, or the first operation and the second operation being different parts of the same operation, and the second operation being used to control a third part of the graphical interface to be displayed on the display unit;
    determining whether a preset condition is satisfied or not during the detecting of the second operation which comprises one of:
    detecting second parameter information related to at least a moving direction of the second operation, and determining whether the second parameter information is the same as first parameter information related to at least a moving direction of the first operation or not;
    when the second operation is a sliding operation, obtaining the number of slides corresponding to the second operation and detecting whether the number of slides reaches a preset threshold; and
    when the first operation and the second operation are the same, obtaining a first starting point corresponding to the first operation, obtaining a first ending point corresponding to the second operation, and detecting whether a first distance from the first starting point to the first ending point is larger than or equal to a preset distance or not;

displaying a speech control overlapped on the graphical interface automatically when the preset condition is satisfied during the detecting of the second operation switching on the speech recognition engine by the speech control, in response to a speech manipulation operation for operating the speech control;

recognizing received speech data by the speech recognition engine;

obtaining, from the recognized speech data, content matched with the recognized speech data and a control instruction for searching the graphical interface for the matched content; and displaying a part of the matched content in the graphical interface displayed by the display unit, in response to the control instruction.

2. The method of claim 1, characterized in that, after determining whether the preset condition is satisfied during the detecting of the second operation to obtain the first decision information, the method comprises:

when the preset condition is not satisfied during the detecting of the second operation, displaying the third part of the graphical interface in the display area in response to the second operation.

3. A method for information processing in an electronic device comprising a sensing unit and a display unit having a display area, the display unit displaying a graphical interface, characterized in that, the method comprising:

detecting a second part of the graphical interface other than a first part of the graphical interface when the display unit displays the first part of the graphical interface;

detecting whether a first length of the second part of the graphical interface displayed in the display area reaches a preset length; and displaying a speech control overlapped on the graphical interface automatically when the first length reaches the preset length switching on the speech recognition engine by the speech control, in response to a speech manipulation operation for operating the speech control;

recognizing received speech data by the speech recognition engine;

obtaining, from the recognized speech data, content matched with the recognized speech data and a control instruction for searching the graphical interface for the matched content; and displaying a part of the matched content in the graphical interface displayed by the display unit, in response to the control instruction.

4. An electronic device comprising a sensing unit and a display unit having a display area, the display unit displaying a graphical interface, the display area displaying a first part of the graphical interface, the electronic device comprises:

a circuit board;

a processor arranged on the circuit board and configured to:

obtain a first operation by the sensing unit when the display unit displays the first part of the graphical interface, the first operation being used to control a second part of the graphical interface to be displayed on the display unit;

display the second part of the graphical interface on the display unit in response to the first operation;

obtain a second operation, the first operation and the second operation being the same or the first operation and the second operation being different parts of the same operation, and the second operation being used to control a third part of the graphical interface to be displayed on the display unit;

determine whether a preset condition is satisfied or not during the detecting of the second operation which comprises one of:

detecting second parameter information related to at least a moving direction of the second operation, and determining whether the second parameter information is the same as first parameter information related to at least a moving direction of the first operation or not;

when the second operation is a sliding operation, obtaining the number of slides corresponding to the second operation and detecting whether the number of slides reaches a preset threshold; and when the first operation and the second operation are the same, obtaining a first starting point corresponding to the first operation, obtaining a first ending point corresponding to the second operation, and detecting whether a first distance from the first starting point to the first ending point is larger than or equal to a preset distance or not;

display a speech control overlapped on the graphical interface automatically when the preset condition is satisfied during the detecting of the second operation;

switch on the speech recognition engine by the speech control, in response to a speech manipulation operation for operating the speech control;

recognize received speech data by the speech recognition engine;

obtain, from the recognized speech data, content matched with the recognized speech data and a control instruction for searching the graphical interface for the matched content; and display a part of the matched content in the graphical interface displayed by the display unit, in response to the control instruction.

* * * * *